(No Model.)
S. ELLIOTT.
WHEEL TIRE AND RIM.
No. 440,701. Patented Nov. 18, 1890.
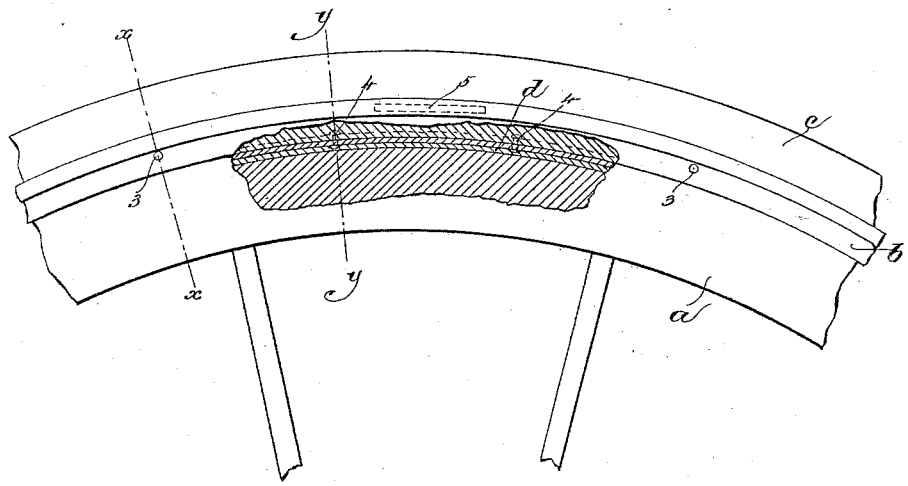
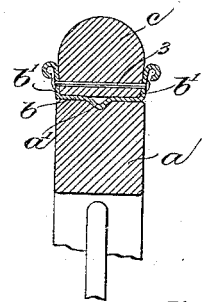 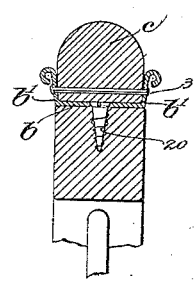 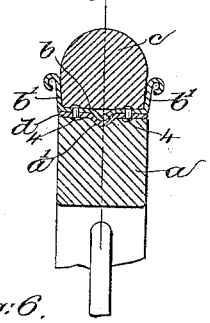
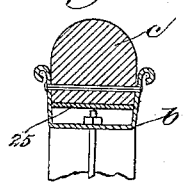 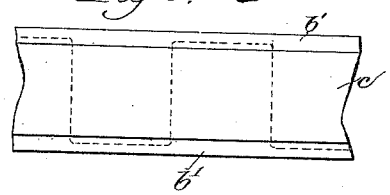
Witnesses.
Fred A. Gumbaf
Frederick L. Emery
Inventor.
Sterling Elliott
by Crosby & Gregory
attys

UNITED STATES PATENT OFFICE.

STERLING ELLIOTT, OF NEWTON, MASSACHUSETTS.

WHEEL TIRE AND RIM.

SPECIFICATION forming part of Letters Patent No. 440,701, dated November 18, 1890.

Application filed July 16, 1888. Serial No. 280,022. (No model.)

*To all whom it may concern:*

Be it known that I, STERLING ELLIOTT, of Newton, county of Middlesex, State of Massachusetts, have invented an Improvement in Means for Attaching Rubber Tires, of which the following description, in connection with the accompanying drawings, is a specification, like letters and figures on the drawings representing like parts.

This invention has for its object to provide improved means for securing rubber tires to wheels.

In accordance with this invention a metallic strip is drawn or passed through suitable dies or rolls to present a trough-shaped band or tire having outwardly-flaring or divergent sides, the upper edges of which sides are rolled over. The rubber tire is placed in this trough-shaped band and fastened by pins or rivets passing through it. The metallic band or tire is fastened to the felly of the wheel by providing the under side of the band or tire with a rib or projection, which enters a groove in the felly of the wheel, or it may be by screws or other suitable fastenings, and at the point where the two ends of the metallic band meet and at the under side thereof a metallic strip is attached, said strip falling and being secured within a recess formed in the face of the felly of the wheel.

Figure 1 shows in side elevation and partly in section a portion only of a wheel having a rubber tire attached in accordance with this invention; Fig. 2, a vertical section of the wheel shown in Fig. 1, taken on the dotted line $xx$; Fig. 3, a vertical section of the wheel shown in Fig. 1, taken on the dotted line $yy$; Fig. 4, a vertical section of the wheel similar to that shown in Fig. 2, a screw being employed as the fastening for the tire; and Figs. 5 and 6, modifications to be referred to.

The usual felly $a$ of the wheel has secured to it a metallic band or tire $b$. This metallic band or tire is made by passing or drawing a strip of metal through suitable dies or rolls, by which it is bent to present a trough-shaped band, having the bottom plate provided with a central depression $a'$ and two upwardly-extended and outwardly-flaring sides $b'$. The central depression $a'$ presents on the under side of the bottom plate of the tire a projection, which enters a groove or recess formed in the felly $a$, thereby serving as a means for fastening the tire to the felly.

The upper edges of the sides $b'$ of the tire are rolled over outwardly, as shown. The rubber tire $c$ is placed in the metallic band or tire thus formed, and is attached to said tire by pins or rivets 3, extending through the sides $b'$ of the metallic tire and through the rubber tire.

The felly $a$ at the point where the ends of the tire meet is cut away to present a recess of suitable size and depth to receive a plate $d$, lying flush with the face of the felly.

The ends of the tire $a$ are each secured to said plate $d$ by suitable rivets, as 4. The openings formed within the overturned edges of the sides $b'$ at the meeting-point of the ends of the tire are reamed out and supplied with dowel-pins 5. (See dotted lines, Fig. 1.) All the fastenings for the tire are hence entirely concealed. The edge of the plate $d$ will be finished like the felly. By making the metallic tire in this manner the rubber tire, when compressed by a direct or lateral pressure, and thereby overlying the metallic edges $b'$, will not be cut or injured by said edges, while said edges are made sufficiently high to properly re-enforce the rubber tire; also, by attaching the rubber tire in this manner it cannot become detached, as is the case when the tire is held in position by cement. The heads or ends of the pins 3 are protected by the overturned edge.

In Fig. 4, as a fastening for the tire, I have shown a screw 20, which I may employ in lieu of the rib $a'$, or pins or rivets may be used.

In Fig. 5 I have omitted the felly $a$, and have connected the spokes directly with the metallic band $b$, and have placed in said trough-shaped band a strip or plate, as 25, upon which rests the tire, said tire being held in place by the pins 3, as before described.

In Fig. 6 I have shown in dotted lines, in lieu of the pins 3, a continuous lacing cord or wire, by which the tire will be held or fastened to the trough-shaped band $b$.

I claim—

1. The metallic band $b$, made of trough shape and having the sides $b'$ extending from the bottom plate and diverging from one another from the plane of the bottom plate and having their outer edges rolled over, substantially as shown and described, and adapted to receive a rubber tire, which is secured in said band by transverse fastenings whose heads are protected by said rolled-over edges, as specified.

2. The felly $a$, recessed as described, and having the plate $d$, combined with the metallic trough-shaped band or tire secured to the plate $d$, and the tire $c$, substantially as described.

3. The felly $a$ and the metallic trough-shaped band or tire having the sides $b'$, the outer edges of which are rolled over or bent outwardly, combined with the dowels 5, substantially as described.

In testimony whereof I have signed my name to this specification in the presence of two subscribing witnesses.

STERLING ELLIOTT.

Witnesses:
BERNICE J. NOYES,
F. L. EMERY.